(12) United States Patent
Gupta et al.

(10) Patent No.: US 12,272,197 B2
(45) Date of Patent: Apr. 8, 2025

(54) CONTROLLING ACCESS BASED ON A MACHINE-LEARNING MODEL

(71) Applicant: ASSA ABLOY AB, Stockholm (SE)

(72) Inventors: Divya Gupta, Gurugram (IN);
Siddharth Gaur, Gurugram (IN);
Jeevan Kaur, Dehradun (IN);
Aravindan Varadan, Bengaluru (IN);
Priya Jindal, Gurgaon (IN); Bhavay Satija, New Delhi (IN)

(73) Assignee: ASSA ABLOY AB, Stockholm (SE)

( * ) Notice: Subject to any disclaimer, the term of this patent is extended or adjusted under 35 U.S.C. 154(b) by 153 days.

(21) Appl. No.: 18/252,582

(22) PCT Filed: Nov. 10, 2021

(86) PCT No.: PCT/EP2021/081194
§ 371 (c)(1),
(2) Date: May 11, 2023

(87) PCT Pub. No.: WO2022/101245
PCT Pub. Date: May 19, 2022

(65) Prior Publication Data
US 2024/0005712 A1    Jan. 4, 2024

(30) Foreign Application Priority Data

Nov. 11, 2020  (IN) .............................. 202011049223
Jan. 20, 2021  (SE) .................................... 2150061-6

(51) Int. Cl.
G07C 9/00         (2020.01)
G07C 9/33         (2020.01)
(52) U.S. Cl.
CPC ..... *G07C 9/00817* (2013.01); *G07C 9/00309* (2013.01); *G07C 9/00563* (2013.01); *G07C 9/33* (2020.01); *G07C 2009/00849* (2013.01)

(58) Field of Classification Search
CPC ............ G07C 9/00817; G07C 9/00309; G07C 9/00563; G07C 9/33; G07C 2009/00849;
(Continued)

(56) References Cited

U.S. PATENT DOCUMENTS 10,380,813 B1 *  8/2019  Edwards ................. G06F 3/017
2013/0251216 A1  9/2013  Smowton et al.
(Continued)

FOREIGN PATENT DOCUMENTS

WO    2008036897    3/2008
WO    2011109005    9/2011
(Continued)

OTHER PUBLICATIONS

"International Application Serial No. PCT IB2017 001114, International Search Report mailed Dec. 12, 2017", 4 pgs.
(Continued)

*Primary Examiner* — Omeed Alizada
(74) *Attorney, Agent, or Firm* — Schwegman Lundberg & Woessner, P.A.

(57) ABSTRACT

It is provided a method for controlling access to a physical space secured by an electronic lock. The method is performed in an access evaluator and comprises: obtaining one or more input parameters relating to a user requesting access to the restricted physical space; evaluating a first access condition based on a credential presented by the user; evaluating a second access condition using a machine-learning model, based on the one or more input parameters; and unlocking the electronic lock when both the first access condition and the second access condition are evaluated to be true.

17 Claims, 3 Drawing Sheets

(58) Field of Classification Search
CPC ... G07C 9/0069; G07C 9/00174; G06F 21/32; H04L 63/0861; H04L 63/083
See application file for complete search history.

(56) References Cited

U.S. PATENT DOCUMENTS

| | | |
|---|---|---|
| 2015/0028996 A1 | 1/2015 | Agrafioti et al. |
| 2015/0227923 A1 | 8/2015 | Kutsch et al. |
| 2018/0268628 A1* | 9/2018 | Jain .................... G07C 9/00182 |
| 2020/0027293 A1* | 1/2020 | Edwards ................ G07C 9/25 |

FOREIGN PATENT DOCUMENTS

| | | |
|---|---|---|
| WO | 2018025086 | 2/2018 |
| WO | 2019027503 | 2/2019 |

OTHER PUBLICATIONS

"International Application Serial No. PCT IB2017 001114, Written Opinion mailed Dec. 12, 2017", 8 pgs.
"International Application Serial No. PCT IB2017 001114, International Preliminary Report on Patentability mailed Feb. 14, 2019", 8 pgs.
"International Application Serial No. PCT EP2021 081194, International Preliminary Report on Patentability mailed Oct. 12, 2022", 9 pgs.
"International Application Serial No. PCT EP2021 081194, International Search Report mailed Jan. 31, 2022", 3 pgs.
"International Application Serial No. PCT EP2021 081194, Written Opinion mailed Jan. 31, 2022", 10 pgs.

* cited by examiner

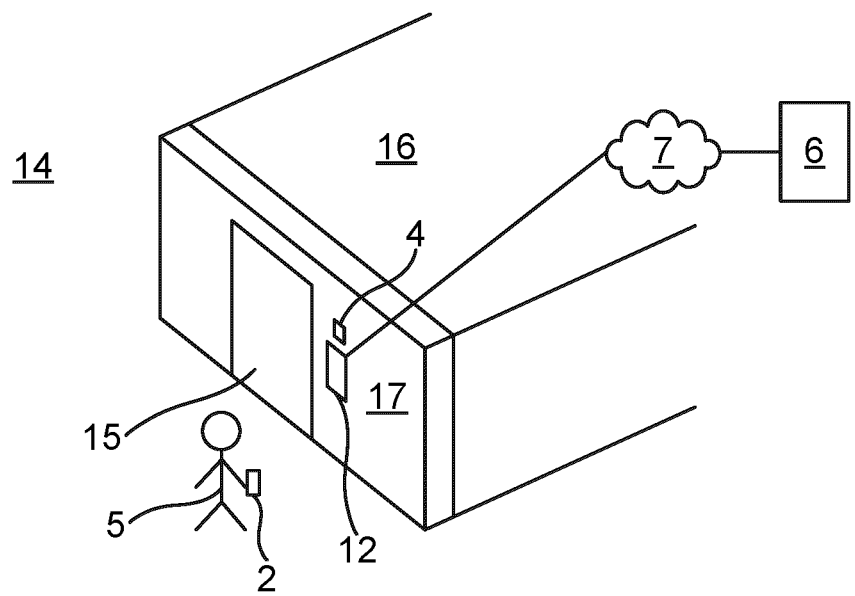
Fig. 1
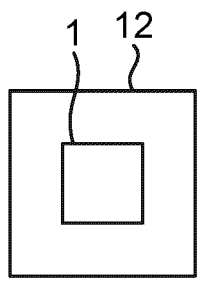 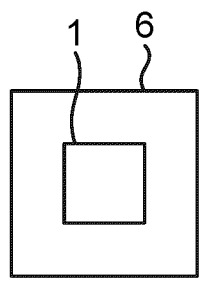 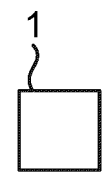
Fig. 2A  Fig. 2B  Fig. 2C

CONTROLLING ACCESS BASED ON A MACHINE-LEARNING MODEL

CROSS-REFERENCE TO RELATED APPLICATION(S)

This application is a national stage application under 35 U.S.C. § 371 of PCT Appl. No. PCT/EP2021/081194, titled "Controlling Access Based on a Machine-Learning Model," filed Nov. 10, 2021, which claims priority to Indian patent application Ser. No. 20/201,1049223, filed Nov. 11, 2020, and to Swedish Patent Appl. No. 2150061-6, filed Jan. 20, 2021, each of which is incorporated herein by reference in its entirety.

TECHNICAL FIELD

The present disclosure relates to the field of access control and in particular to controlling access to a physical space secured by an electronic lock, based on an access condition being evaluated using a machine-learning model

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened based on a PIN (Personal Identification Number) code and/or an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

For current electronic locks, a credential, e.g. in the form of a PIN code or electronic key being a card, a wearable device or smartphone, can be used for authentication. However, such credentials can be learned or stolen by an attacker to thereby gain access to the physical space secured by the electronic lock.

In the solutions available today, when an attacker gains access to the credential, the original owner of the credential needs to inform the lock of this breach of security, to e.g. blacklist the compromised credential. However, the original user may not even be aware of the attacker's possession of the credential.

SUMMARY

One object is to improve security for electronic locks when a credential has been compromised.

According to a first aspect, it is provided a method for controlling access to a physical space secured by an electronic lock. The method is performed in an access evaluator and comprises: obtaining one or more input parameters relating to a user requesting access to the restricted physical space; evaluating a first access condition based on a credential presented by the user; evaluating a second access condition using a machine-learning model, based on the one or more input parameters; unlocking the electronic lock when both the first access condition and the second access condition are evaluated to be true; evaluating a third access condition when the first access condition is evaluated to be true and the second access condition is evaluated to be false; unlocking the electronic lock when both the first access condition and the third access condition are evaluated to be true; and training the machine learning model with the one or more input parameters when both the first access condition and the third access condition are evaluated to be true.

The one or more input parameters may include an input parameter based on detecting body movement of the user.

The one or more input parameters may include an input parameter based on how the user presents the credential for the evaluation of the first access condition.

The one or more input parameters may include an input parameter based on how a PIN, personal identification number, code is entered, in which case the first access condition is evaluated based on the entered PIN code.

The one or more input parameters may include an input parameter based on a duration between the user stops and when the PIN code is entered.

The one or more input parameters may include an input parameter based on a distance to the user detected by a distance sensor mounted in proximity to the electronic lock.

The one or more input parameters may include an input parameter based on a time of day of the user requesting access.

The evaluating a first access condition may comprise evaluating an electronic key presented by the user.

According to a second aspect, it is provided an access evaluator for controlling access to a physical space secured by an electronic lock. The access evaluator may comprise: a processor; and a memory storing instructions that, when executed by the processor, cause the access evaluator to: obtain one or more input parameters relating to a user requesting access to the restricted physical space; evaluate a first access condition based on a credential presented by the user; evaluate a second access condition using a machine-learning model, based on the one or more input parameters; and unlock the electronic lock when both the first access condition and the second access condition are evaluated to be true; evaluate a third access condition when the first access condition is evaluated to be true and the second access condition is evaluated to be false; unlock the electronic lock when both the first access condition and the third access condition are evaluated to be true; and train the machine learning model with the one or more input parameters when both the first access condition and the third access condition are evaluated to be true.

The one or more input parameters may include an input parameter based on detecting body movement of the user.

The one or more input parameters may include an input parameter based on how the user presents the credential for the evaluation of the first access condition.

The one or more input parameters may include an input parameter based on how a PIN, personal identification number, code is entered, in which case the first access condition is evaluated based on the entered PIN code.

The one or more input parameters may include an input parameter based on a duration between the user stops and when the PIN code is entered.

The one or more input parameters may include an input parameter based on a distance to the user detected by a distance sensor mounted in proximity to the electronic lock.

The one or more input parameters may include an input parameter based on a time of day of the user requesting access.

The instructions to evaluate a first access condition may comprise instructions that, when executed by the processor, cause the access evaluator to evaluate an electronic key presented by the user.

According to a third aspect, it is provided a computer program for controlling access to a physical space secured by an electronic lock, the computer program comprising computer program code which, when executed on an access evaluator causes the access evaluator to: obtain one or more input parameters relating to a user requesting access to the restricted physical space; evaluate a first access condition based on a credential presented by the user; evaluate a second access condition using a machine-learning model, based on the one or more input parameters; and unlock the electronic lock when both the first access condition and the second access condition are evaluated to be true; evaluate a third access condition when the first access condition is evaluated to be true and the second access condition is evaluated to be false; unlock the electronic lock when both the first access condition and the third access condition are evaluated to be true; and train the machine learning model with the one or more input parameters when both the first access condition and the third access condition are evaluated to be true.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 1 is a schematic diagram illustrating an environment in which embodiments presented herein can be applied;

FIGS. 2A-C are schematic diagram illustrating embodiments of where the access evaluator can be implemented;

DETAILED DESCRIPTION

Figure 3:
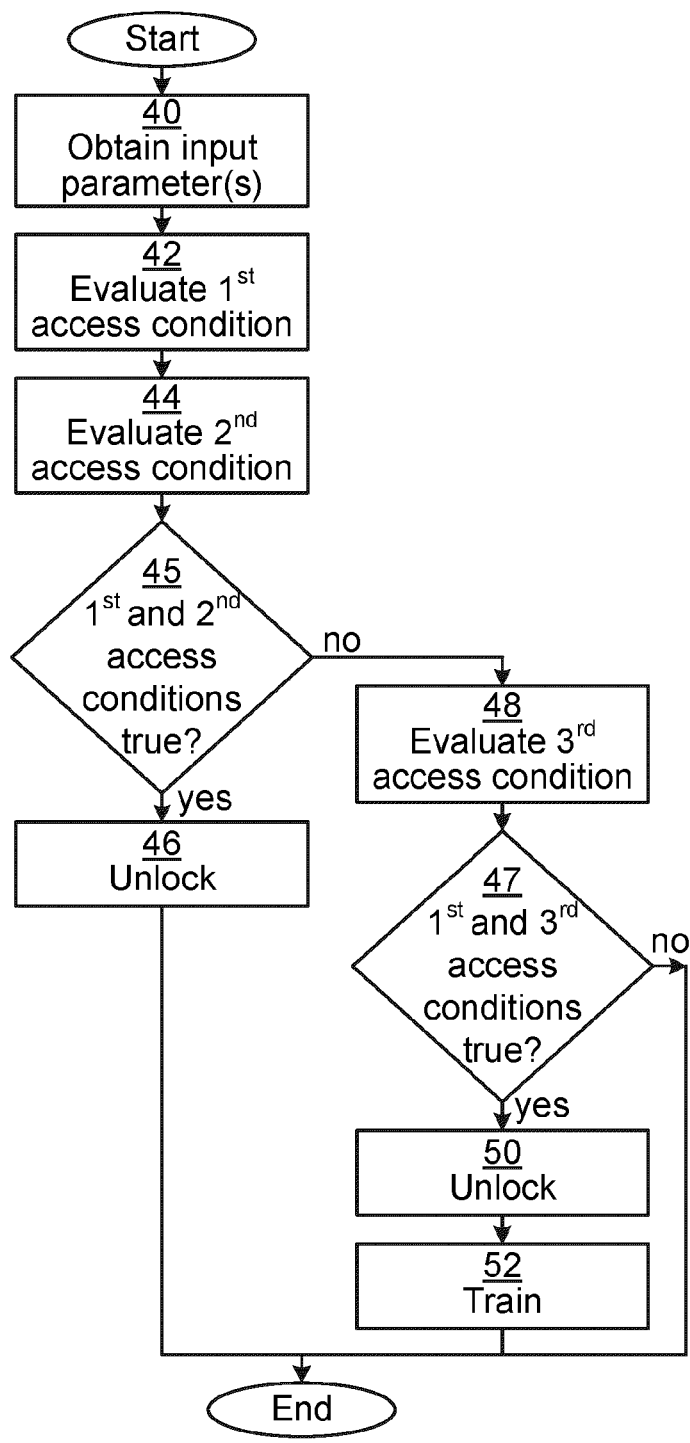
FIG. 3 is a flow chart illustrating embodiments of methods for controlling access to a physical space.

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

FIG. 1 is a schematic diagram illustrating an environment in which embodiments presented herein can be applied. Access to a physical space 16 is restricted by an openable physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. An electronic lock 12 is provided in order to control access to the physical space 16, by selectively unlocking the barrier 15.

The electronic lock 12 can be provided in a structure 17 (such as a wall) surrounding the barrier 15 (as shown) or the electronic lock 12 can be provided in the barrier 15 itself (not shown). The electronic lock 12 is controllable to be in a locked state or in an unlocked state.

A first access condition is evaluated based on a credential presented by the user. The credential can e.g. be a PIN code entered by the user 15 and/or an electronic key 2 presented by the user. The PIN code can be a sequence of digits, entered on a keypad. Alternatively or additionally, the credential is based on biometrics, such as fingerprint detection or iris detection. When the credential is an electronic key 2, the electronic lock 12 is able to receive and send signals from/to the electronic key 2 over a communication channel which may be a short-range wireless interface. Optionally, the electronic lock 12 comprises a separate unit, also known as an access control reader, for communicating with the electronic key 2 and evaluating access. The electronic key 2 is implemented using any suitable device that is portable by a user 5 and which can be used by the electronic lock 12 as the first access condition used in evaluating whether to grant access or not, by communicating over the communication channel. The electronic key 2 can comprise digital cryptographic keys for electronic authentication. The electronic key 2 can be carried or worn by a user 5 and may be implemented as a smartphone, wearable device, key fob, smartcard (RFID and/or galvanic), etc.

The communication interface between the electronic key 2 and the electronic lock 12 can be a radio frequency wireless interface and could e.g. employ ultra-wideband (UWB), Bluetooth, Bluetooth Low Energy (BLE), ZigBee, Radio Frequency Identification (RFID), any of the IEEE 802.11 standards, any of the IEEE 802.15 standards, wireless Universal Serial Bus (USB), etc. Alternatively, the communication interface is based on a galvanic connection. Using the communication channel, the identity of the electronic key 2 can be obtained and the first access condition can be evaluated.

A sensor 4 is optionally provided by the electronic lock 12. The sensor 4 is used to generate one or more input parameters relating to a user 5 requesting access to the restricted physical space 16. The one or more input parameters are used in a machine learning model to evaluate a second access condition. The result (or prediction) of the machine learning model forms the second access condition which is used to evaluate whether access is to be granted and the electronic lock is to be unlocked.

This access process is coordinated by an access evaluator. As shown in FIGS. 2A-C and described below, the access evaluator can be provided as part of the electronic lock 12, a server 6 or as a stand-alone device.

The access evaluator has access to a machine-learning model. The access evaluator can comprise the machine-learning model or the machine-learning model can be provided in a separate device in communication with the access evaluator.

The machine-learning model is thus used to evaluate the second access condition. The one or more input parameters can be any suitable input parameter(s) relating to the user requesting access. For instance, a sensor 4 can be used to capture data relating to the user 5 when requesting access.

The sensor 4 can e.g. be any one or more of a camera, lidar, distance sensor, proximity sensor, microphone to capture data of the user, optionally also based on duration. The one or more input parameters can also include time, e.g. current time and/or day from a clock, or how credentials (e.g. PIN code) are presented.

Using the one or more input parameters, detected characteristic behaviour of the user 5 is used by the machine-learning model to evaluate the second access condition. Optionally, the second access condition is a combination of separate sub-conditions, e.g. relating to different sets of input parameters and/or different machine-learning models of the same parameters.

Using the machine-learning model and the one or more input parameters, the evaluation of the second access condition can e.g. be based on an input parameter detecting body movement of the user and/or how a PIN code is entered, e.g. the duration between the user stopping and when the PIN code is entered. Alternative or additional input parameters include distance to the user 5, or time of day that the user requests access.

When both the first and second access conditions are true, the access control by access evaluator results in granted access, and the electronic lock 12 is set in an unlocked state. When the electronic lock 12 is in the unlocked state, the barrier 15 can be opened and when the electronic lock 12 is in a locked state, the barrier 15 cannot be opened. In this way, access to a restricted space 16 is effected by the electronic lock 12.

The electronic lock 12 optionally contains communication capabilities to connect to a server 6 via a communication network 7. The communication network 7 can be a wide area network, such as the Internet. The server 6 can be implemented in a single computer or in multiple computers, also known as being in the cloud.

FIGS. 2A-C are schematic diagram illustrating embodiments of where the access evaluator 1 can be implemented.

In FIG. 2A, the access evaluator 1 shown as implemented in the electronic lock. The electronic lock is thus the host device for the access evaluator 1 in this implementation. This allows for short latency for communication since the communication is local.

In FIG. 2B, the access evaluator 1 shown as implemented in the server 6, also known as in the cloud. The server is thus the host device for the access evaluator 1 in this implementation.

In FIG. 2C, the access evaluator 1 is shown as implemented as a stand-alone device. The access evaluator 1 thus does not have a host device in this implementation. The access evaluator 1 can be provided in proximity to the electronic lock or in any other suitable location.

FIG. 3 is a flow chart illustrating embodiments of methods for controlling access to a physical space. The methods are performed in the access evaluator.

In an obtain input parameter(s) step 40, the access evaluator obtains one or more input parameters relating to a user requesting access to the restricted physical space.

In an evaluate first access condition step 42, the access evaluator evaluates a first access condition based on a credential presented by the user. For instance, the credential can be a PIN code entered by the user and/or an electronic key presented by the user and/or biometrics of the user. It is to be noted that this step can be performed after the evaluate second access condition step 44 or before the obtain input parameter(s) step 40.

In an evaluate second access condition step 44, the access evaluator evaluates a second access condition using a machine-learning model, based on the one or more input parameters.

In one embodiment, the one or more input parameters include an input parameter based on detecting body movement of the user, e.g. detected by a sensor in the form of a camera and/or lidar. This can be used by a machine-learning model e.g. to detect a posture or gait associated with the user.

In one embodiment, the one or more input parameters include an input parameter based on how the user presents a credential for the evaluation of the first access condition. For instance, the one or more input parameters can include an input parameter based on how a PIN code is entered, and wherein the first access condition is evaluated based on the entered PIN code. For example, the one or more input parameters can include an input parameter based on a duration between the user stops and when the PIN code is entered. This can be one characteristic used to evaluate the second access condition.

In one embodiment, the one or more input parameters include an input parameter based on a distance to the user detected by a distance sensor mounted in proximity to the electronic lock. This distance over time to the user can then be used to evaluate the second access condition.

In one embodiment, the one or more input parameters include an input parameter based on a time of day of the user requesting access.

Two or more input parameters can be used in a single machine-learning model, e.g. to evaluate distance to the user over time, combined with the delay until the user presents the credential (e.g. as a PIN code or an electronic key). In one embodiment, the machine-learning model considers delay between individual key presses when the PIN code is entered to determine the second access condition indicating if the user is a legitimate user.

The machine-learning model used is associated with a particular user, which can be identified e.g. using the credential used in step 42.

Other types of situations for the user that the machine-learning model can be trained to include in the second access condition include usual times of access requests for the electronic lock, frequency of access requests for the electronic lock, group of users visiting at the same time, duration of entering the credential (e.g. PIN code), type of credential used (if several credential types are supported).

The machine-learning model can be pre-trained with data collected through surveys, research and/or from previous implementation. The data can be classified based on various parameters like age, height of user, gender, type of premises, accessibility to lock etc. This pre-trained model can thus serve as an initial user-specific model based on the characteristics of the user. As explained below, the machine-learning model can then be improved and tailored for the user based on the one or more input parameters obtained for the user.

Optionally, the second access condition is a combination of separate sub-conditions, e.g. relating to different sets of input parameters and/or different machine-learning models of the same parameters.

In a conditional $1^{st}$ and $2^{nd}$ access conditions true step 45, the access evaluator determines whether both the first access condition and the second access condition are evaluated to be true. When this is the case, the method proceeds to an unlock step 46. Otherwise, the method ends, or, in one embodiment, proceeds to an evaluate $3^{rd}$ access condition step 48.

In the unlock step 46, the electronic lock is unlocked. This can be implemented by transmitting an unlock signal to the electronic lock.

In the evaluate $3^{rd}$ access condition step 48, the access evaluator evaluates a third access condition. The third access condition can e.g. be biometric data, a one-time password transmitted to a mobile, a PIN code (if the second condition is not based on PIN code), etc.

In an optional conditional $2^{nd}$ and $3^{rd}$ access conditions true step 47, the access evaluator determines whether both the first access condition and the third access condition are evaluated to be true. When this is the case, the method proceeds to a unlock step 50. Otherwise, the method ends. By using the third access condition, a legitimate user can still gain access if the machine-learning based second access condition for some reason is negative.

In the unlock step 50, the access evaluator unlocks the electronic lock. This can be implemented in the same way as the previously mentioned unlock step 46.

In an train model step 52, the access evaluator trains the machine learning model with the one or more input parameters when both the first access condition and the third access condition are evaluated to be true. Since the third access condition is true in this case, it is considered that the user is a legitimate user. Hence, the second access condition was incorrectly determined to be false. This incorrect evaluation (of the machine learning model) thus constitutes a valuable training condition, where the machine-learning model is trained in step 52 to reduce the risk of the same type of incorrect false first condition evaluation to occur in the future.

Using the training, the system adapts to each user. Over time this results in a convenient yet secure system, where only deviations in the machine-learning model based second access condition (based on the machine-learning model) requires evaluation of the third access condition. An attacker is likely to fail the second access condition evaluation which is trained and tailored for the specific user using steps 48 and 52. Moreover, since the training is performed based on these conditions evaluated by the access evaluator, no manual involvement in the training is needed, ensuring that the training occurs and in an efficient manner.

Using embodiments presented herein, if an attacker is able to force a positive evaluation of the first access condition, e.g. by learning the PIN code or stealing the electronic key, the attacker is likely prevented from gaining access, since the attacker is likely to fail the evaluation of dynamic access policy. Additionally, the embodiments presented herein prevent access by an attacker without the legitimate user needing to inform the access system; the evaluation of the second access condition will likely prevent the attack in any case. This is of a great use, since the legitimate user may not be aware of the attacker gaining access to the credential, e.g. by stealing a bag or learning a PIN code by watching the user entering the PIN code.

Figure 4:
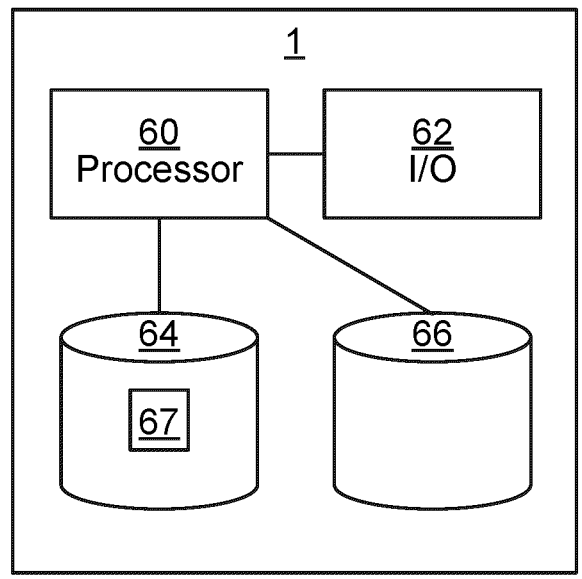
FIG. 4 is a schematic diagram illustrating components of the access evaluator of FIGS. 2A-C.

FIG. 4 is a schematic diagram illustrating components of the access evaluator of FIGS. 2A-C. It is to be noted that one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The access evaluator further comprises an I/O interface 62 for communicating with external and/or internal entities. Optionally, the I/O interface 62 also includes a user interface.

Other components of the access evaluator are omitted in order not to obscure the concepts presented herein.

Figure 5:
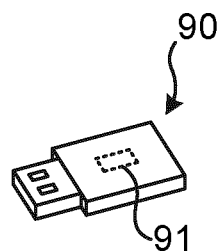
FIG. 5 shows one example of a computer program product comprising computer readable means

FIG. 5 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 4. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Here now follows a list of embodiments, enumerated with roman numerals.

i. A method for controlling access to a physical space secured by an electronic lock, the method being performed in an access evaluator and comprising:
obtaining one or more input parameters relating to a user requesting access to the restricted physical space;
evaluating a first access condition based on a credential presented by the user;
evaluating a second access condition using a machine-learning model, based on the one or more input parameters; and
unlocking the electronic lock when both the first access condition and the second access condition are evaluated to be true.

ii. The method according to embodiment i, further comprising:
evaluating a third access condition when the first access condition is evaluated to be true and the second access condition is evaluated to be false; and
unlocking the electronic lock when both the first access condition and the third access condition are evaluated to be true.

iii. The method according to embodiment ii, further comprising:
training the machine learning model with the one or more input parameters when both the first access condition and the third access condition are evaluated to be true.

iv. The method according to any one of the preceding embodiments, wherein the one or more input parameters include an input parameter based on detecting body movement of the user.
v. The method according to any one of the preceding embodiments, wherein the one or more input parameters include an input parameter based on how the user presents the credential for the evaluation of the first access condition.
vi. The method according to any one of the preceding embodiments, wherein the one or more input parameters include an input parameter based on how a PIN, personal identification number, code is entered, and wherein the first access condition is evaluated based on the entered PIN code.
vii. The method according to embodiment vi, wherein the one or more input parameters include an input parameter based on a duration between the user stops and when the PIN code is entered.
viii. The method according to any one of the preceding embodiments, wherein the one or more input parameters include an input parameter based on a distance to the user detected by a distance sensor mounted in proximity to the electronic lock.
ix. The method according to any one of the preceding embodiments, wherein the one or more input parameters include an input parameter based on a time of day of the user requesting access.
x. The method according to any one of the preceding embodiments, wherein the evaluating a first access condition comprises evaluating an electronic key presented by the user.
xi. An access evaluator for controlling access to a physical space secured by an electronic lock, the access evaluator comprising:
a processor; and
a memory storing instructions that, when executed by the processor, cause the access evaluator to:
obtain one or more input parameters relating to a user requesting access to the restricted physical space;
evaluate a first access condition based on a credential presented by the user;
evaluate a second access condition using a machine-learning model, based on the one or more input parameters; and
unlock the electronic lock when both the first access condition and the second access condition are evaluated to be true.
xii. The access evaluator according to embodiment xi, further comprising instructions that, when executed by the processor, cause the access evaluator to:
evaluate a third access condition when the first access condition is evaluated to be true and the second access condition is evaluated to be false; and
unlock the electronic lock when both the first access condition and the third access condition are evaluated to be true.
xiii. The access evaluator according to embodiment xii, further comprising instructions that, when executed by the processor, cause the access evaluator to:
train the machine learning model with the one or more input parameters when both the first access condition and the third access condition are evaluated to be true.
xiv. The access evaluator according to any one of embodiments xi to xiii, wherein the one or more input parameters include an input parameter based on detecting body movement of the user.
xv. The access evaluator according to any one of embodiments xi to xiv, wherein the one or more input parameters include an input parameter based on how the user presents the credential for the evaluation of the first access condition.
xvi. The access evaluator according to any one of embodiments xi to xv, wherein the one or more input parameters include an input parameter based on how a PIN, personal identification number, code is entered, and wherein the first access condition is evaluated based on the entered PIN code.
xvii. The access evaluator according to embodiment xvi, wherein the one or more input parameters include an input parameter based on a duration between the user stops and when the PIN code is entered.
xviii. The access evaluator according to any one of embodiments xi to xvii, wherein the one or more input parameters include an input parameter based on a distance to the user detected by a distance sensor mounted in proximity to the electronic lock.
xix. The access evaluator according to any one of embodiments xi to xviii, wherein the one or more input parameters include an input parameter based on a time of day of the user requesting access.
xx. The access evaluator according to any one of embodiments xi to xix, wherein the instructions to evaluate a first access condition comprise instructions that, when executed by the processor, cause the access evaluator to evaluate an electronic key presented by the user.
xxi. A computer program for controlling access to a physical space secured by an electronic lock, the computer program comprising computer program code which, when executed on an access evaluator causes the access evaluator to:
obtain one or more input parameters relating to a user requesting access to the restricted physical space;
evaluate a first access condition based on a credential presented by the user;
evaluate a second access condition using a machine-learning model, based on the one or more input parameters; and
unlock the electronic lock when both the first access condition and the second access condition are evaluated to be true.
xxii. A computer program product comprising a computer program according to embodiment xxi and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:
1. A method for controlling access to a physical space secured by an electronic lock, the method being performed in an access evaluator and comprising:
obtaining one or more input parameters relating to a user requesting access to the restricted physical space;
evaluating a first access condition based on a credential presented by the user;

evaluating a second access condition using a machine-learning model, based on the one or more input parameters;
unlocking the electronic lock when both the first access condition and the second access condition are evaluated to be true;
evaluating a third access condition when the first access condition is evaluated to be true and the second access condition is evaluated to be false;
unlocking the electronic lock when both the first access condition and the third access condition are evaluated to be true; and
training the machine learning model with the one or more input parameters when both the first access condition and the third access condition are evaluated to be true.

2. The method according to claim 1, wherein the one or more input parameters include an input parameter based on detecting body movement of the user.

3. The method according to claim 1, wherein the one or more input parameters include an input parameter based on how the user presents the credential for the evaluation of the first access condition.

4. The method according to claim 1, wherein the one or more input parameters include an input parameter based on how a PIN, personal identification number, code is entered, and wherein the first access condition is evaluated based on the entered PIN code.

5. The method according to claim 4, wherein the one or more input parameters include an input parameter based on a duration between the user stops and when the PIN code is entered.

6. The method according to claim 1, wherein the one or more input parameters include an input parameter based on a distance to the user detected by a distance sensor mounted in proximity to the electronic lock.

7. The method according to claim 1, wherein the one or more input parameters include an input parameter based on a time of day of the user requesting access.

8. The method according to claim 1, wherein evaluating the first access condition comprises evaluating an electronic key presented by the user.

9. An access evaluator for controlling access to a physical space secured by an electronic lock, the access evaluator comprising:
a processor; and
a memory storing instructions that, when executed by the processor, cause the access evaluator to:
obtain one or more input parameters relating to a user requesting access to the restricted physical space;
evaluate a first access condition based on a credential presented by the user;
evaluate a second access condition using a machine-learning model, based on the one or more input parameters;
unlock the electronic lock when both the first access condition and the second access condition are evaluated to be true;
evaluate a third access condition when the first access condition is evaluated to be true and the second access condition is evaluated to be false;
unlock the electronic lock when both the first access condition and the third access condition are evaluated to be true; and
train the machine learning model with the one or more input parameters when both the first access condition and the third access condition are evaluated to be true.

10. The access evaluator according to claim 9, wherein the one or more input parameters include an input parameter based on detecting body movement of the user.

11. The access evaluator according to claim 9, wherein the one or more input parameters include an input parameter based on how the user presents the credential for the evaluation of the first access condition.

12. The access evaluator according to claim 9, wherein the one or more input parameters include an input parameter based on how a PIN, personal identification number, code is entered, and wherein the first access condition is evaluated based on the entered PIN code.

13. The access evaluator according to claim 12, wherein the one or more input parameters include an input parameter based on a duration between the user stops and when the PIN code is entered.

14. The access evaluator according to claim 9, wherein the one or more input parameters include an input parameter based on a distance to the user detected by a distance sensor mounted in proximity to the electronic lock.

15. The access evaluator according to claim 9, wherein the one or more input parameters include an input parameter based on a time of day of the user requesting access.

16. The access evaluator according to claim 9, wherein the instructions to evaluate the first access condition comprise instructions that, when executed by the processor, cause the access evaluator to evaluate an electronic key presented by the user.

17. A computer readable storage medium storing a computer program for controlling access to a physical space secured by an electronic lock, the computer program comprising computer program code which, when executed on an access evaluator, causes the access evaluator to:
obtain one or more input parameters relating to a user requesting access to the restricted physical space;
evaluate a first access condition based on a credential presented by the user;
evaluate a second access condition using a machine-learning model, based on the one or more input parameters;
unlock the electronic lock when both the first access condition and the second access condition are evaluated to be true;
evaluate a third access condition when the first access condition is evaluated to be true and the second access condition is evaluated to be false;
unlock the electronic lock when both the first access condition and the third access condition are evaluated to be true; and
train the machine learning model with the one or more input parameters when both the first access condition and the third access condition are evaluated to be true.

* * * * *